(12) United States Patent
Branlund et al.

(10) Patent No.: US 11,552,669 B2
(45) Date of Patent: *Jan. 10, 2023

(54) PRECISION ARRAY PROCESSING USING SEMI-COHERENT TRANSCEIVERS

(71) Applicant: Tarana Wireless, Inc., Santa Clara, CA (US)

(72) Inventors: Dale Branlund, Portola Valley, CA (US); Harry May, Sunnyvale, CA (US)

(73) Assignee: Tarana Wireless, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/167,457

(22) Filed: Oct. 22, 2018

(65) Prior Publication Data

US 2019/0068235 A1 Feb. 28, 2019

Related U.S. Application Data

(63) Continuation of application No. 13/831,535, filed on Mar. 14, 2013, now Pat. No. 10,110,270.

(51) Int. Cl.
*H04B 1/40* (2015.01)

(52) U.S. Cl.
CPC ...................................... *H04B 1/40* (2013.01)

(58) Field of Classification Search
CPC ..... H04L 2027/0067; H04L 2027/0069; H04L 27/205; H04L 27/233; H04L 7/0337; H04L 27/2014; H04L 27/22; H04L 27/368; H04W 56/0085; H04W 74/0866; H04B 1/7075; H04B 1/709
See application file for complete search history.

(56) References Cited

U.S. PATENT DOCUMENTS

| | | | |
|---|---|---|---|
| 6,122,260 A | 9/2000 | Liu et al. | |
| 6,219,561 B1 | 4/2001 | Raleigh | |
| 6,289,062 B1 | 9/2001 | Wang et al. | |
| 6,580,328 B2 | 6/2003 | Tan et al. | |
| 6,771,985 B1 | 8/2004 | Iinuma | |
| 6,795,424 B1 | 9/2004 | Kapoor et al. | |
| 6,865,169 B1 | 3/2005 | Quayle et al. | |
| 7,003,310 B1 | 2/2006 | Youssefmir et al. | |
| 7,187,723 B1 * | 3/2007 | Kawanabe ............ H04B 7/084 342/371 |
| 7,333,455 B1 | 2/2008 | Bolt et al. | |
| 7,340,279 B2 | 3/2008 | Chen et al. | |
| 7,366,120 B2 | 4/2008 | Handforth et al. | |
| 7,493,129 B1 | 2/2009 | Mostafa et al. | |

(Continued)

FOREIGN PATENT DOCUMENTS

| | | |
|---|---|---|
| EP | 1865642 A1 | 12/2007 |
| EP | 2071745 A1 | 6/2009 |

(Continued)

OTHER PUBLICATIONS

European Search Report dated Nov. 17, 2016 in connection with European patent application No. 14770285.6, 8 pages.

(Continued)

*Primary Examiner* — Awet Haile
(74) *Attorney, Agent, or Firm* — Stoel Rives LLP (57) ABSTRACT

A system and method for precision array processing using semi-coherent transceivers are disclosed.

23 Claims, 10 Drawing Sheets

Adaptive Array Radio System using Semi-Coherent Transceiver

(56) References Cited

U.S. PATENT DOCUMENTS

| | | | |
|---|---|---|---|
| 7,502,355 B2 | 3/2009 | Bednekoff et al. | |
| 7,567,543 B2 | 7/2009 | Cao et al. | |
| 7,640,020 B2 | 12/2009 | Gutowski | |
| 7,646,752 B1 | 1/2010 | Periyalwar et al. | |
| 7,688,739 B2 | 3/2010 | Frei et al. | |
| 7,720,444 B2 | 5/2010 | Darabi et al. | |
| 7,839,856 B2 | 11/2010 | Sinha et al. | |
| 8,238,318 B1 | 8/2012 | Negus | |
| 8,416,872 B2 | 4/2013 | Higuchi et al. | |
| 8,502,733 B1* | 8/2013 | Negus | H04W 4/00 |
| | | | 342/359 |
| 8,531,471 B2 | 9/2013 | Chen et al. | |
| 8,811,348 B2 | 8/2014 | Rangan et al. | |
| 9,252,908 B1 | 2/2016 | Branlund | |
| 9,325,409 B1 | 4/2016 | Branlund | |
| 9,456,354 B2 | 9/2016 | Branlund | |
| 9,502,022 B2 | 11/2016 | Chang et al. | |
| 9,735,940 B1 | 8/2017 | Bakr et al. | |
| 10,110,270 B2 | 10/2018 | Branlund et al. | |
| 2002/0042290 A1 | 4/2002 | Williams et al. | |
| 2003/0035468 A1 | 2/2003 | Corbaton et al. | |
| 2004/0095256 A1* | 5/2004 | Mohamadi | G08C 17/02 |
| | | | 340/870.18 |
| 2005/0141624 A1 | 6/2005 | Lakshmipathi et al. | |
| 2005/0245192 A1 | 11/2005 | Karabinis | |
| 2006/0119440 A1* | 6/2006 | Isobe | H03L 7/0802 |
| | | | 331/16 |
| 2006/0135070 A1 | 6/2006 | Karabinis | |
| 2008/0117101 A1 | 5/2008 | Pan | |
| 2008/0130496 A1 | 6/2008 | Kuo et al. | |
| 2008/0214196 A1 | 9/2008 | Sambhwani et al. | |
| 2008/0233967 A1 | 9/2008 | Montojo et al. | |
| 2008/0247388 A1 | 10/2008 | Horn | |
| 2008/0261602 A1 | 10/2008 | Livneh | |
| 2008/0278394 A1 | 11/2008 | Koh et al. | |
| 2008/0317014 A1 | 12/2008 | Veselinovic et al. | |
| 2009/0110033 A1 | 4/2009 | Shattil | |
| 2009/0111409 A1* | 4/2009 | Sun | H03L 7/093 |
| | | | 455/208 |
| 2009/0310693 A1 | 12/2009 | Baker et al. | |
| 2009/0316675 A1 | 12/2009 | Malladi et al. | |
| 2010/0035620 A1 | 2/2010 | Naden et al. | |
| 2010/0046595 A1 | 2/2010 | Sikri et al. | |
| 2010/0067476 A1 | 3/2010 | Periyalwar et al. | |
| 2010/0087149 A1 | 4/2010 | Srinivasan et al. | |
| 2010/0093391 A1 | 4/2010 | Saban et al. | |
| 2010/0195619 A1 | 8/2010 | Bonneville et al. | |
| 2010/0215032 A1 | 8/2010 | Jalloul et al. | |
| 2010/0248644 A1* | 9/2010 | Kishi | H04B 1/3822 |
| | | | 455/68 |
| 2010/0254295 A1 | 10/2010 | Lee et al. | |
| 2010/0296459 A1 | 11/2010 | Miki et al. | |
| 2011/0034200 A1 | 2/2011 | Leabman | |
| 2011/0039509 A1* | 2/2011 | Bruchner | H04B 1/40 |
| | | | 455/232.1 |
| 2011/0051731 A1 | 3/2011 | Mang et al. | |
| 2011/0105054 A1 | 5/2011 | Cavin | |
| 2011/0150045 A1* | 6/2011 | Thompson | H04B 1/28 |
| | | | 375/147 |
| 2011/0269410 A1 | 11/2011 | Tsujimoto et al. | |
| 2011/0274032 A1 | 11/2011 | Leng et al. | |
| 2012/0051480 A1* | 3/2012 | Usugi | H03L 7/087 |
| | | | 375/376 |
| 2012/0082151 A1* | 4/2012 | Liu | H03L 7/093 |
| | | | 370/342 |
| 2012/0108257 A1 | 5/2012 | Kwon et al. | |
| 2012/0129539 A1 | 5/2012 | Arad et al. | |
| 2013/0044028 A1 | 2/2013 | Lea et al. | |
| 2013/0094522 A1 | 4/2013 | Moshfeghi | |
| 2013/0095747 A1 | 4/2013 | Moshfeghi | |
| 2013/0142136 A1 | 6/2013 | Pi et al. | |
| 2013/0207841 A1 | 8/2013 | Negus et al. | |
| 2013/0237261 A1 | 9/2013 | Bazzi et al. | |
| 2015/0124713 A1 | 5/2015 | Salhov et al. | |
| 2015/0244458 A1 | 8/2015 | Erkmen et al. | |
| 2016/0119052 A1 | 4/2016 | Frerking et al. | |

FOREIGN PATENT DOCUMENTS

| | | | |
|---|---|---|---|
| GB | 2350265 A | 11/2000 | |
| JP | 2010522516 A | 7/2010 | |
| JP | 2010525678 A | 7/2010 | |
| JP | 2010183573 A | 8/2010 | |
| WO | 9820633 A2 | 5/1998 | |
| WO | 0205493 A2 | 1/2002 | |
| WO | 02063896 A1 | 8/2002 | |
| WO | WO-2004079782 A2 * | 9/2004 | H04B 1/109 |
| WO | 2005101882 A1 | 10/2005 | |
| WO | 2007082142 A2 | 7/2007 | |
| WO | 2008033369 A2 | 3/2008 | |
| WO | 2009119463 A2 | 10/2009 | |
| WO | 2010003509 A1 | 1/2010 | |
| WO | 2010013245 A1 | 2/2010 | |
| WO | 2012037643 A1 | 3/2012 | |

OTHER PUBLICATIONS

International Preliminary Report on Patentability dated Sep. 15, 2015 in connection with International Patent Application No. PCT/US2014/026696, 5 pages.

International Search Report and Written Opinion dated Sep. 19, 2014 in connection with International Patent Application No. PCT/US2014/026696, 6 pages.

"Adaptive Frequency-Domain Equalization and Diversity Combining for Broadband Wireless Communications" by Martin V. Clark; IEEE Journal dated Oct. 1998.

"Load- and Interference-Aware Channel Assignment for Dual-Radio Mesh Backhauls" by Michelle X. Gong et al.; IEEE Communications Society; dated 2008.

"Echo Cancellation and Channel Estimation for On-Channel Repeaters in DVB-T/H Networks" by Karim M. Nasr et al.; Brunel University; dated after Jan. 2006.

"The Bits and Flops of the N-hop Multilateration Primitive for Node Localization Problems" by Andreas Savvides et al.; UCLA; dated Sep. 28, 2002.

"Signal Acquisition and Tracking with Adaptive Arrays in the Digital Mobile Radio System IS-54 with Flat Fading", "Signal Acquisition and Tracking with Adaptive Arrays in the Digital Mobile Radio System IS-54 with Flat Fading" by Jack H. Winters; IEEE Transactions; dated Nov. 4, 1993.

Communication pursuant to Article 94(3) EPC received in EP 14770285.6 dated Oct. 2, 2017.

* cited by examiner

OFDM Null Depth Results

- The left plot shows the 2 OFDM waveforms generated with independent LOs (blue and green plots) and the null formed by subtracting them (red plot). The average null depth is -36.8dB.
- The right plot shows the phase difference between the 2 different OFDM waveforms. The rms value of phase difference across the OFDM tones is 0.66°, which is just about the same as the integrated phase noise.
- The average null depth of -36.8dB also correlates with the 0.66° phase error.

- The number of tones is 4000 and the tone spacing is 1kHz.
- Note the time duration for this simulation is only 1ms, as opposed to 10ms for the previous simulations.

FIGURE 7

Beamformer Simulation

- The left plot shows the layout of the 16-element circular array. The simulation was performed at 1GHz with radius equal to lamda/2.
- The right plot shows the distances from the elements to the center of the array for AOAs of 0, 80, 90, 100, 120, 130, 140, 150, -80, -90, -100, -120, -130, and -140 degrees.

FIGURE 8

Simulation Results with 16 OFDM Waveforms

- The plot below shows the results of the simulation with all 15 interferers present.
- The blue plot is the beamformer output with all 16 independent signals present (16 AOAs: desired signal plus 15 interferers).
- The green plot is the beamformer output with the desired signal amplitude set to zero and all 15 interference signals present.
- The null depth in this case is 35.4 dB.
- The difference between this case and the previous case is 12 dB. This is expected since the previous case had 1 interferer and this case has 15 interferes and 10LOG(15) = 11.8 dB.

FIGURE 9

Conclusion

- The results show an improvement in beamformer output SNR when only 1 interferer is present, vs N interferers, with the degradation decreasing as 10*LOGN.
- For a single OFDM waveform and channel, there is a relationship between the LO phase noise and signal SNR given by SNR = 20*LOG(PN). This curve is plotted in blue below.
- For the fully loaded array case (16 signals for 16 elements studied here), the null depth is about 3dB worse than the blue curve. The green curve is Null = 20*LOG(PN)+3. This curve matches the simulation results as the phase noise is varied.

PRECISION ARRAY PROCESSING USING SEMI-COHERENT TRANSCEIVERS

PRIORITY CLAIMS/RELATED APPLICATIONS

This patent application is a continuation of U.S. patent application Ser. No. 13/831,535, filed Mar. 14, 2013, "Precision Array Processing Using Semi-Coherent Transceivers," the entirety of which is incorporated herein by reference.

FIELD

The disclosure relates generally to adaptive array processing and in particular to using semi-coherent transceivers for adaptive array processing.

BACKGROUND

Modern communications, radar, and wireless systems use adaptive array processing as part of the system. The adaptive array processing is often being done using all digital processing or a mixture of digital and analogue processing. These systems include receivers, transmitters and transceivers that coherently down-convert/up-convert radio frequency (RF) and microwave signals to low intermediate frequency (IF)/analogue signals or digital baseband signals. Coherency is important since beamformers or interference cancellers point beams and nulls where the accuracy of pointing depends on stable amplitude and phase responses for each of the transceivers in the architecture. To achieve coherency, many systems use a common clock, local oscillator and/or synthesizer and a distribution network to each of the transceivers in the architecture. The coherency ensures that phase, amplitude and frequency fluctuations of these sources are "common mode" with respect to the array response. Thus, beam pointing and null steering accuracy is not affected by these impairments. However, as the number of transceivers increases in the system, it is very cumbersome to distribute the clock signals, error prone and potentially costly. This is particular true if the system has distributed component/antennas where cabling and connectors can become significant sources of cost and error in the design.

Thus, it is desirable to provide a precision array processing using semi-coherent transceivers and it is to this end that the disclosure is directed.

DETAILED DESCRIPTION OF ONE OR MORE EMBODIMENTS

The disclosure is particularly applicable to a precision array processing system in a wireless communications system and it is in this context that the disclosure will be described. It will be appreciated, however, that the system and method has greater utility since the precision array processing system with semi-coherent transceivers may be used for other communication system, radar systems or other systems that use precision array processing.

Figure 1:
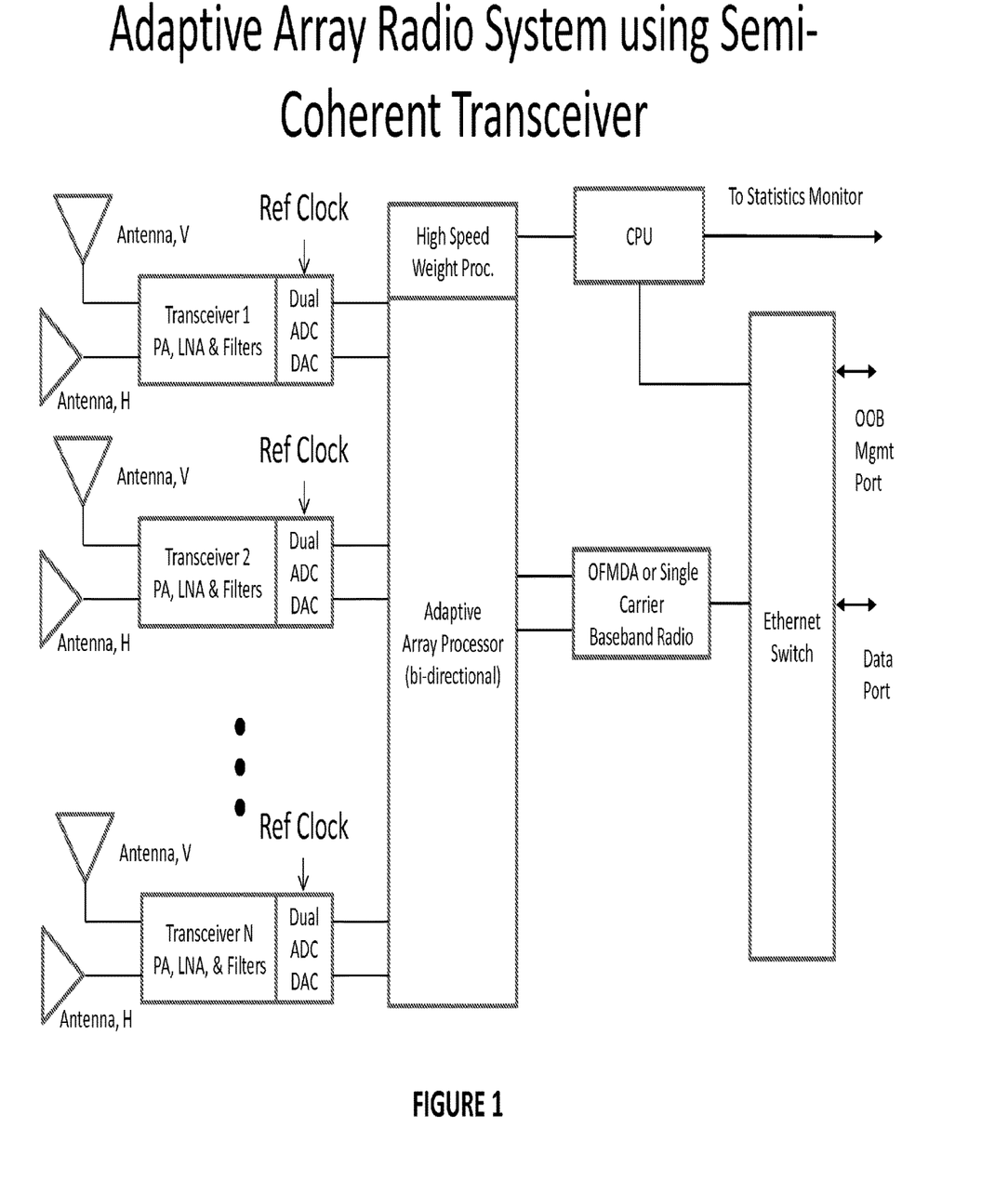
FIG. 1 illustrates a precision array radio system using a semi-coherent transceiver subsystem.

FIG. 1 illustrates an adaptive array radio system comprised of an N channel semi-coherent RF transceiver subsystem, adaptive array processing subsystem, baseband radio, control CPU and Ethernet switch, herein called an adaptive array radio system.

Figure 2:
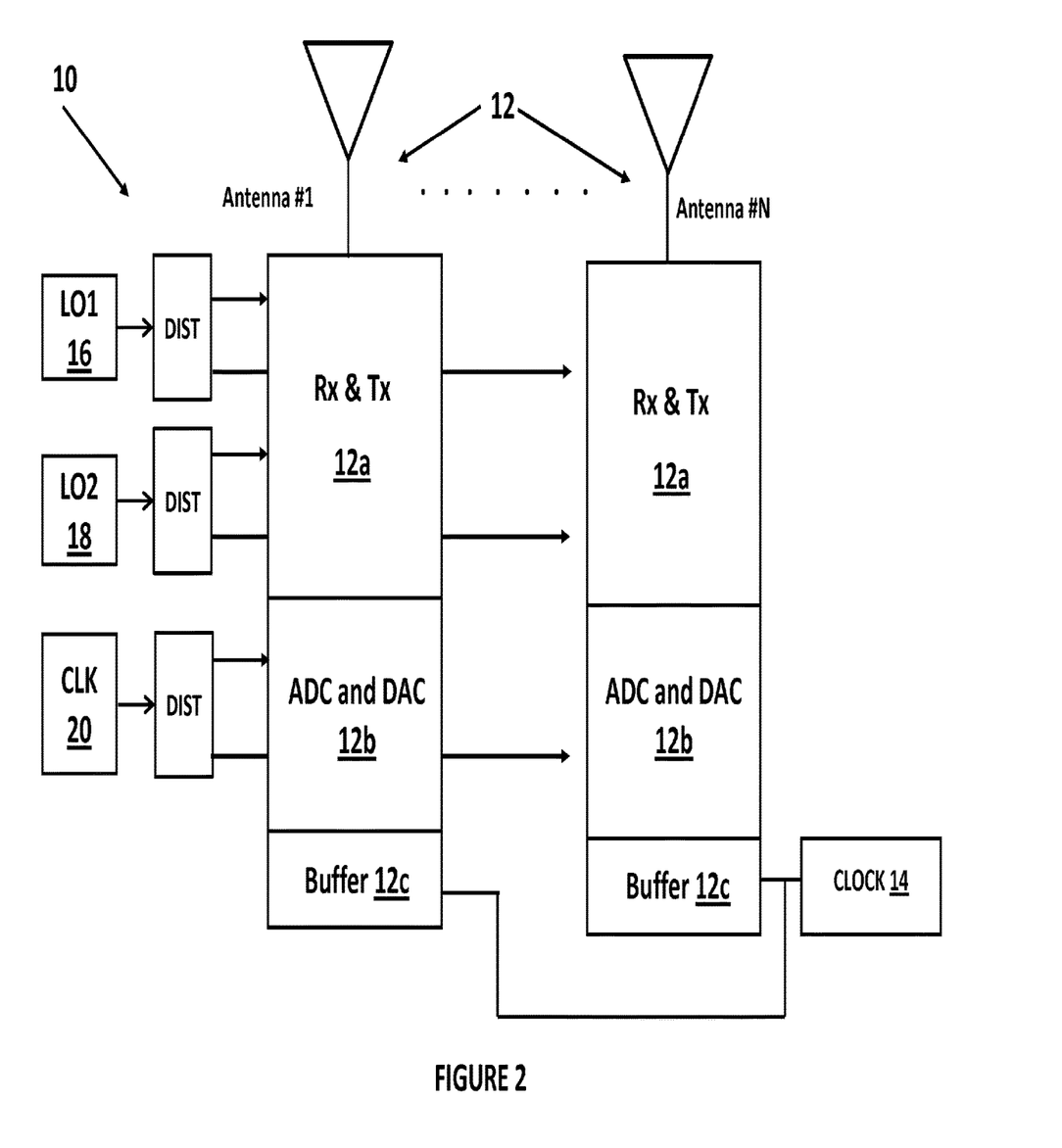
FIG. 2 illustrates an N channel coherent transceiver subsystem (prior art) for precision array processing.

FIG. 2 illustrates a precision array transceiver subsystem 10 using coherent transceivers in which the system has one or more transceivers 12 that each have an antenna (antenna 1, ..., antenna N) and all of the antennas form the adaptive array and thus need adaptive array processing to receive or transmit signals. Each transceiver 12 may have a receiver and transmitter portion 12a (which are separate circuits for receiving signals and transmitting signals, respectively, but are shown here together for simplicity), signal conversion portion 12b, such as analog to digital (ADC) and digital to analog (DAC) and a buffer 12c. The buffer in each transceivers is controlled in part by a single clock source 14. In the system in FIG. 2, one or more local oscillators (LO1 16 and LO2 18 in FIG. 2) are coupled to each transceiver 12 using a distributor. Furthermore, an ADC/DAC clock 20 is also distributed to each transceiver 12 using the distributor (DIST) as shown. In the system in FIG. 2, the clock distribution becomes problematic as the number of transceivers increases as if the system has distributed components. This challenge may be overcome by a system that uses semi-coherent transceivers for precision array processing.

Figure 3:
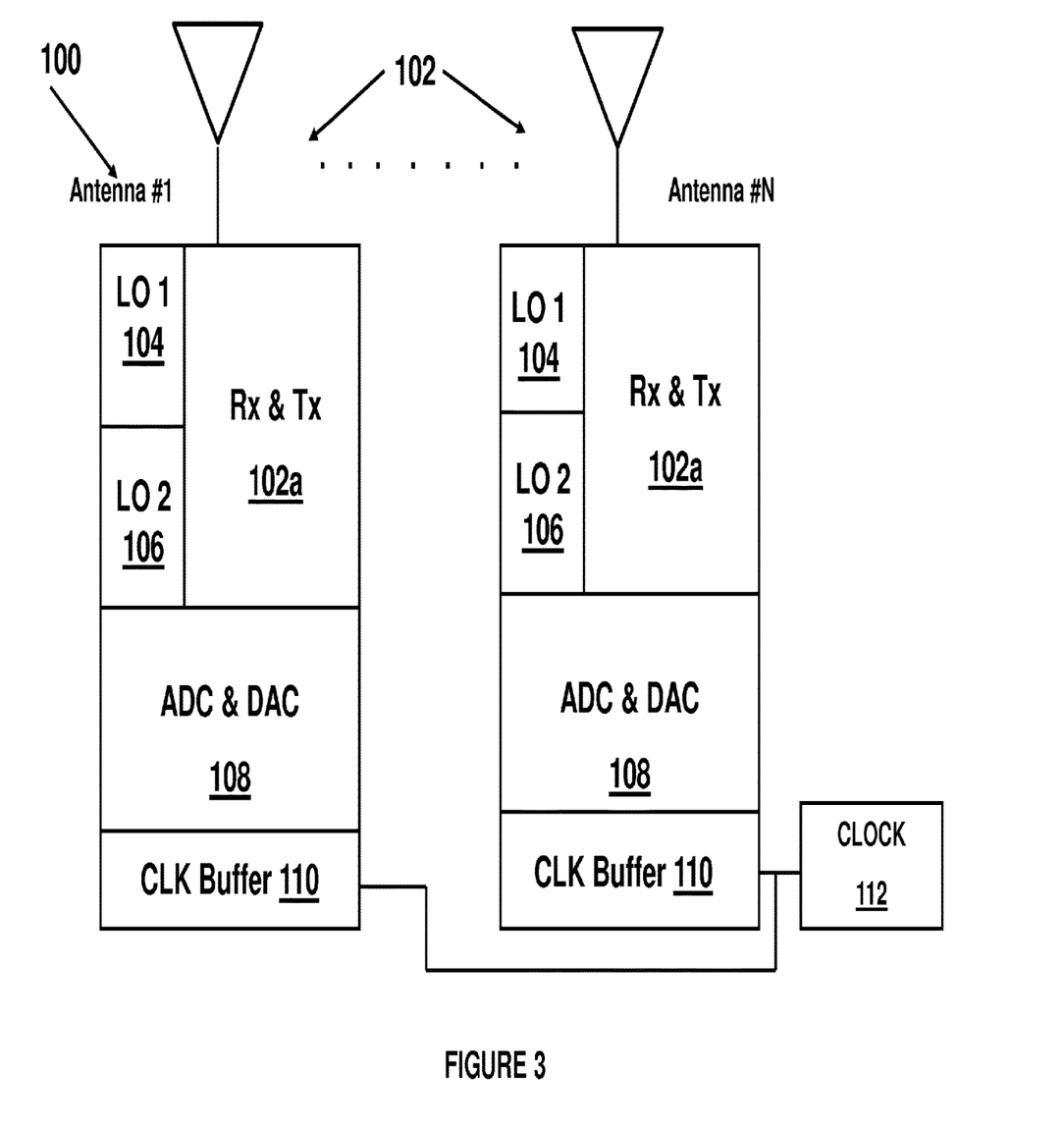
FIG. 3 illustrates an N channel semi-coherent transceiver subsystem for precision array processing (new art)

FIG. 3 illustrates a precision array transceiver subsystem 100 using semi-coherent transceivers 102. In the system 100, there may be a plurality of transceivers 102 that each have an antenna (antenna 1, ..., antenna N for a number N of transceivers) and all of the antennas form the adaptive array and the transceivers perform the adaptive array processing to receive or transmit signals. Each transceiver 102 may have a receiver and transmitter portion 102a (which are separate circuits for receiving signals and transmitting signals, respectively, but are shown here together for simplicity). Each transceiver 102 also may have integrated local oscillators 104, 106, integrated ADC/DAC circuits 108 and a CLK buffer 110. As with the system in FIG. 2, the buffers are clocked by a clock signal from a clock 112.

The system in FIG. 3 simplifies the design of adaptive array systems and to reduce the cost of the system. Unlike the system in FIG. 2 in which the local oscillator signals and ADC/clock signals are distributed among the transceivers, the system in FIG. 2 removes the requirement for a fully coherent architecture of N transceivers. Instead, a plurality of semi-coherent transceivers 102 driven by a single clock source are used. As shown in FIG. 2, that is an implementation of the system, local LO/Synthesizers are used in each of the N transceivers. Often, as shown in the implementation in FIG. 2, the LO/Synthesizer 104-18 may be integrated with the other components of the transceiver 102 in a single silicon device. Then, each LO/Synthesizer 104-108 may be locked to the incoming clock.

The semi-coherent transceiver architecture in FIG. 3 works by controlling the phase, amplitude and frequency errors between transceiver within an error band over a given time interval. These errors are typically statistical in nature and are predefine at the system level, prior to the design of the transceiver. Once these errors are defined, the topology of the local LO/Synthesizer Phase Lock Loops (PLL) can be determined. Then, the design of the PLLs comprised of VCOs, divider chains, phase detector, loop filters can proceed. In some embodiments, an external common signal source is injected into all N channels to calibrate bulk phase and amplitude offsets among the N channels. Moreover, since in single reference clock with embedded sync is the only requirement to maintain semi-coherency, then the antenna array may be divided into subarrays that are spatially separated at arbitrary displacements.

Design Principles, Equations and Results

Figure 4:
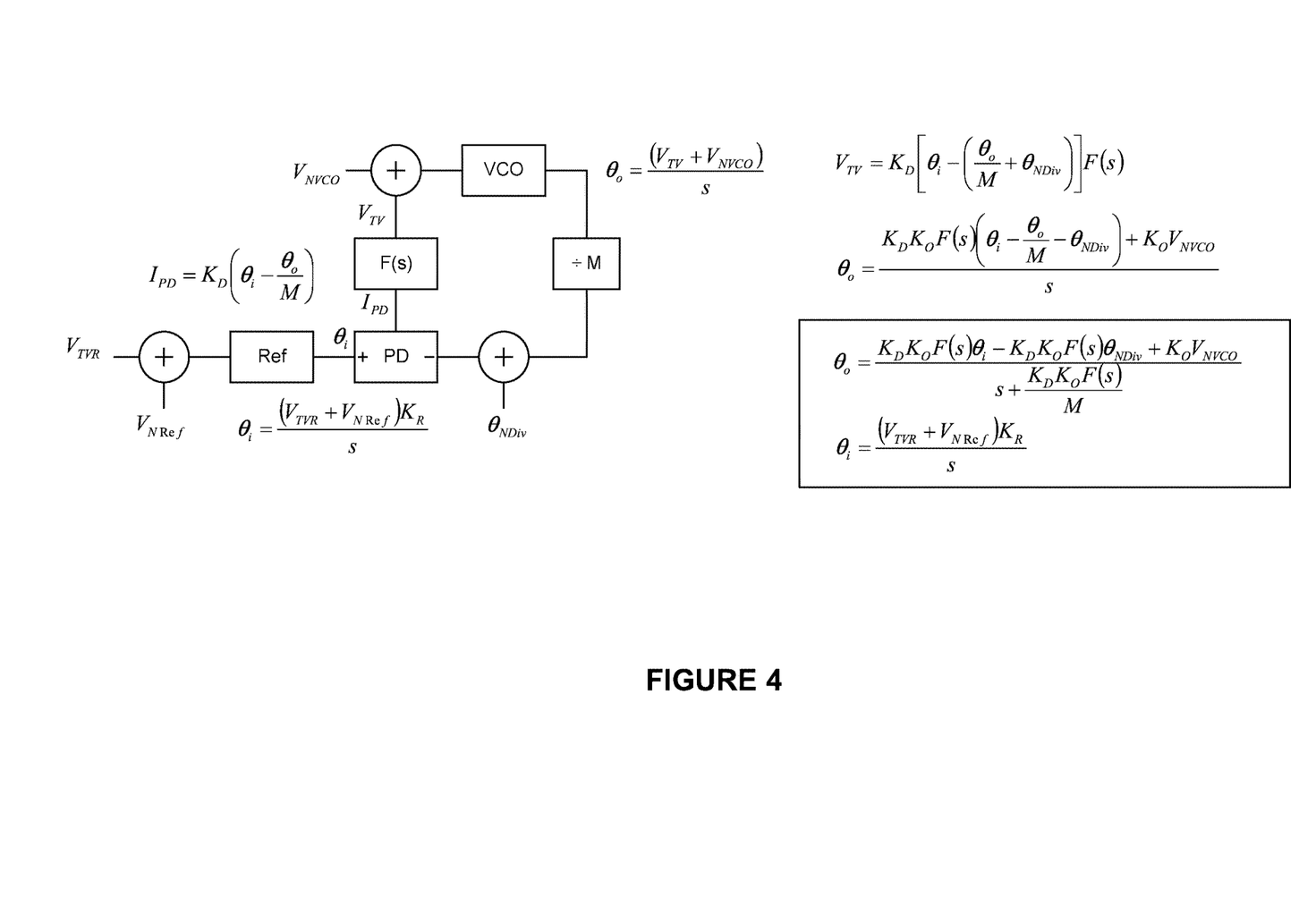
FIG. 4 illustrates a typical phase lock loop (PLL) used in Local Oscillators (LOs), Synthesizers, and Clock Generators.

Local Oscillators are typically realized using PLLs as shown in FIG. 4. A voltage controlled oscillator (VCO) provides the LO frequency of operation. The VCO control voltage is derived from the loop filter F(s) by low pass filtering the phase difference output of a Phase Detector (PD). The phase difference is derived as the reference phase (Ref) less the phase of VCO divided by a factor M. Thus the output frequency of the VCO is M times the reference frequency and locked exactly to the phase of the reference.

FIG. 4 also illustrates additive noise terms that effect the performance of the PLL. These terms appear in real world embodiments of VCOs, dividers, PDs, and the reference signal. The noise terms cause the phase of VCO to deviate from the phase of the reference. Thus, two such VCOs operating with the same reference will not be coherent—that is, the phase difference between VCO1 and VCO2 will not be zero since the noise terms in each PLL are independent statistical processes. However, the statistics of this phase difference can be controlled so that the VCOs are "semi-coherent". Well designed semi-coherent VCOs and the LOs derived from them can be thought of as coherent from an adaptive array processing point of the view give certain performance criteria. In this disclosure, one performance criteria is spatial null depth. Perfect coherency permits infinitely deep spatial null depths when cancelling interference. That is, any interference regardless of power level can be cancelled. Semi-coherent transceivers cause the spatial nulls to fill in to a given depth. If an interference is stronger than the null depth, then the interference cannot be cancelled perfectly.

Figure 5:
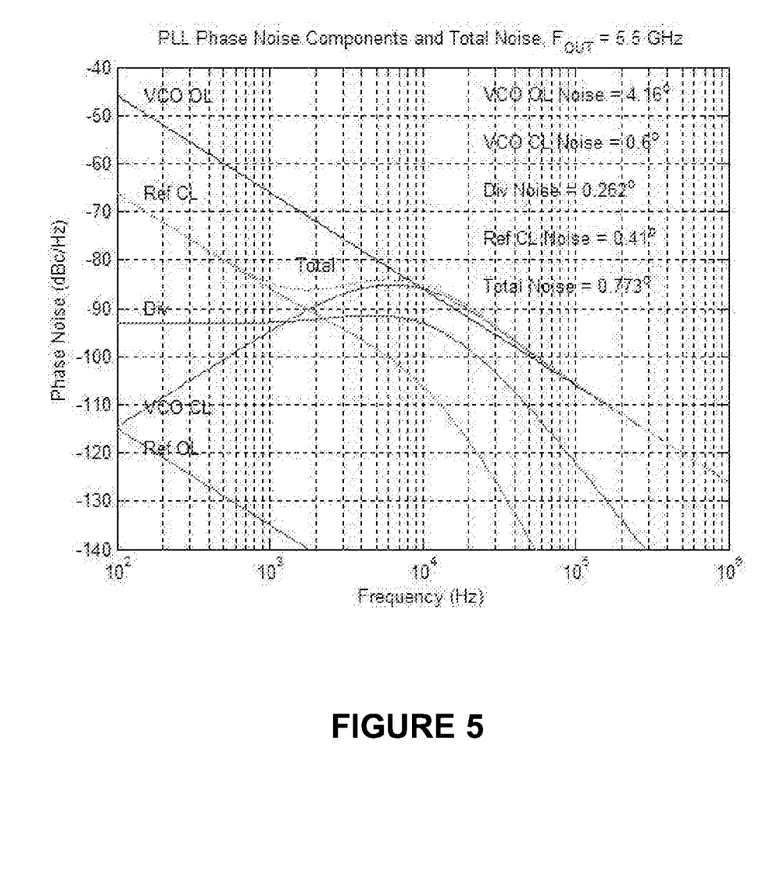
FIG. 5 illustrates the phase noise for an exemplary PLL in the Frequency Domain.

FIG. 5 provides the parameters of well designed PLL of FIG. 4 designed for a 5.5 GHz LO in an N channel semi-coherent transceiver subsystem as part of a modern adaptive array processor. It also illustrates the phase noise for each of noise components of this embodiment as a function of frequency. Finally, the total composite phase noise off the PLL is shown as 0.773 degrees. Excellent phase noise performance at this level ensures that the semi-coherent transceiver design will perform in a similar fashion to the fully coherent design for most practical applications.

Figure 6:
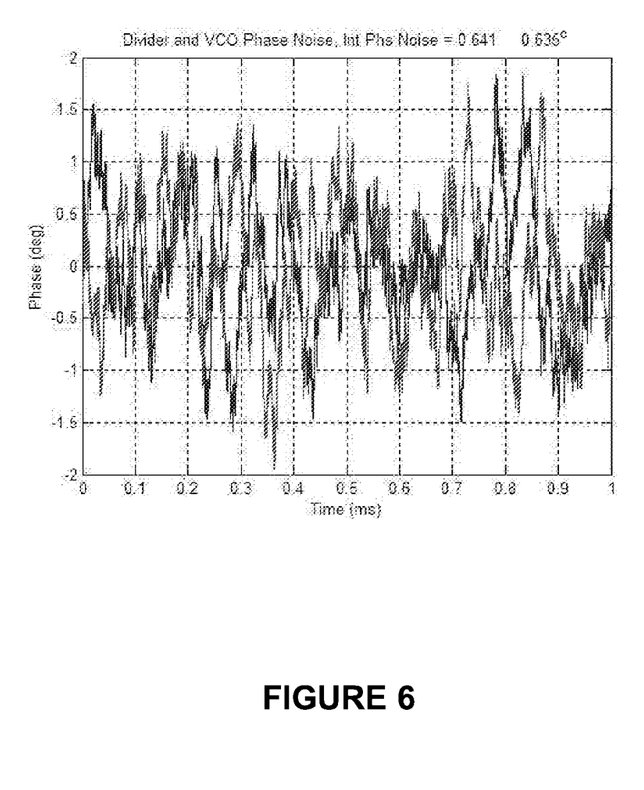
FIG. 6 illustrates the time domain phase noise on 2 PLLs used in a two channel semi-coherent transceiver.

This is further illustrated in FIG. 6. The LO phase noise from two independent PLLs are generated using the design of FIG. 4 and the parameters of FIG. 5. Each PLL forming LO1$a$ and LO1$b$ was driven from a common CLOCK reference as shown in FIG. 3. The two LOs were used to downconvert an OFDMA waveform (WiMax, LTE) to form two time domain sequences as illustrated. The two waveforms and then subtracted to determine their similarity, coherency and null depth of two waveforms when subtracted.

Figure 7:
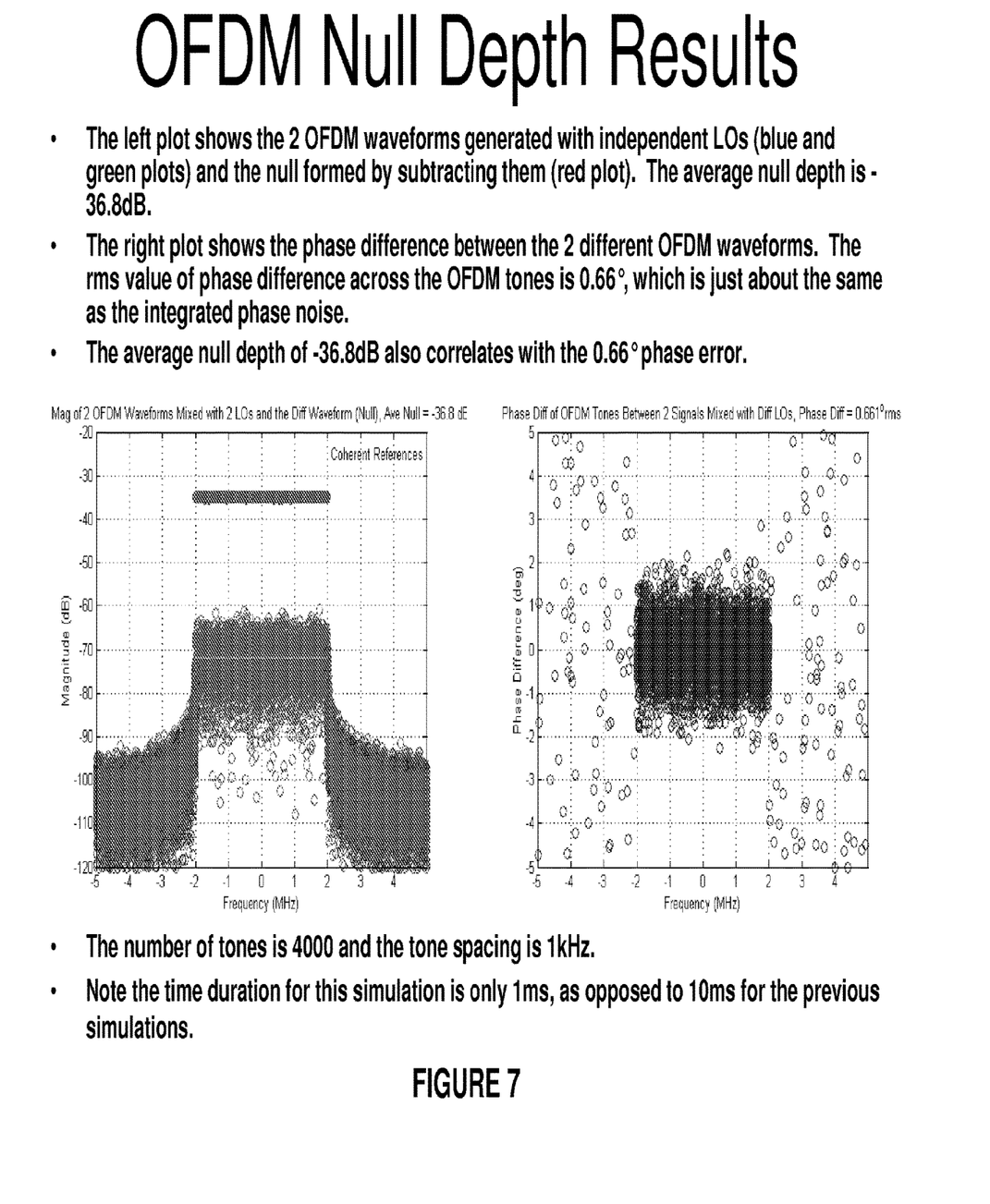
FIG. 7 illustrates the null depth of a two channel semi-coherent transceiver used for adaptive beamforming and null steering.

FIG. 7 illustrates the result. In this figure, the two time domain waveforms and the difference waveform are transformed into the frequency domain by an FFT, that is the same FFT used to process the OFDMA waveform for demodulation. The average null depth of the phase difference waveform is −36.8 dB when referenced to the power in either baseband waveform.

Figure 8:
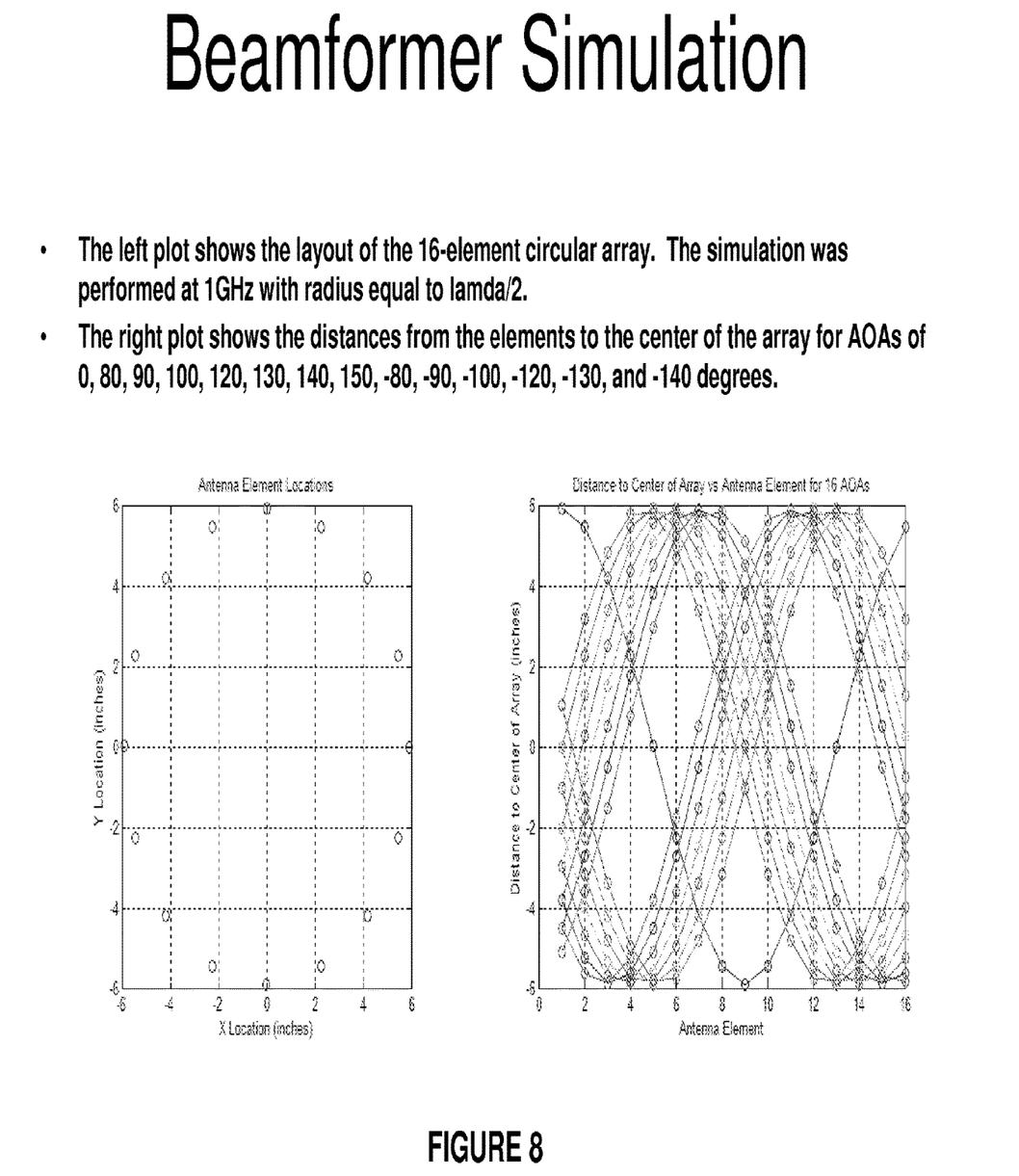
FIG. 8 shows an exemplary adaptive antenna array used in the test of a 16 antenna semi-coherent adaptive array processing system.

FIG. 8 extends the performance analysis to a 16 antenna semi-coherent transceiver subsystem used as the front end of an adaptive array processor. There are 16 semi-coherent LOs using the design of FIG. 4 with parameters of FIG. 5. The geometry of the antenna array is shown in on the left and the distance to the center of the array is shown on the right for selected angles of arrival (AOA). The AOAs may be assigned to one signal of interest and 15 other interferences. The performance of the interference cancellation relative to the desired signal may then be measured as limited by the semi-coherency of the transceivers.

Figure 9:
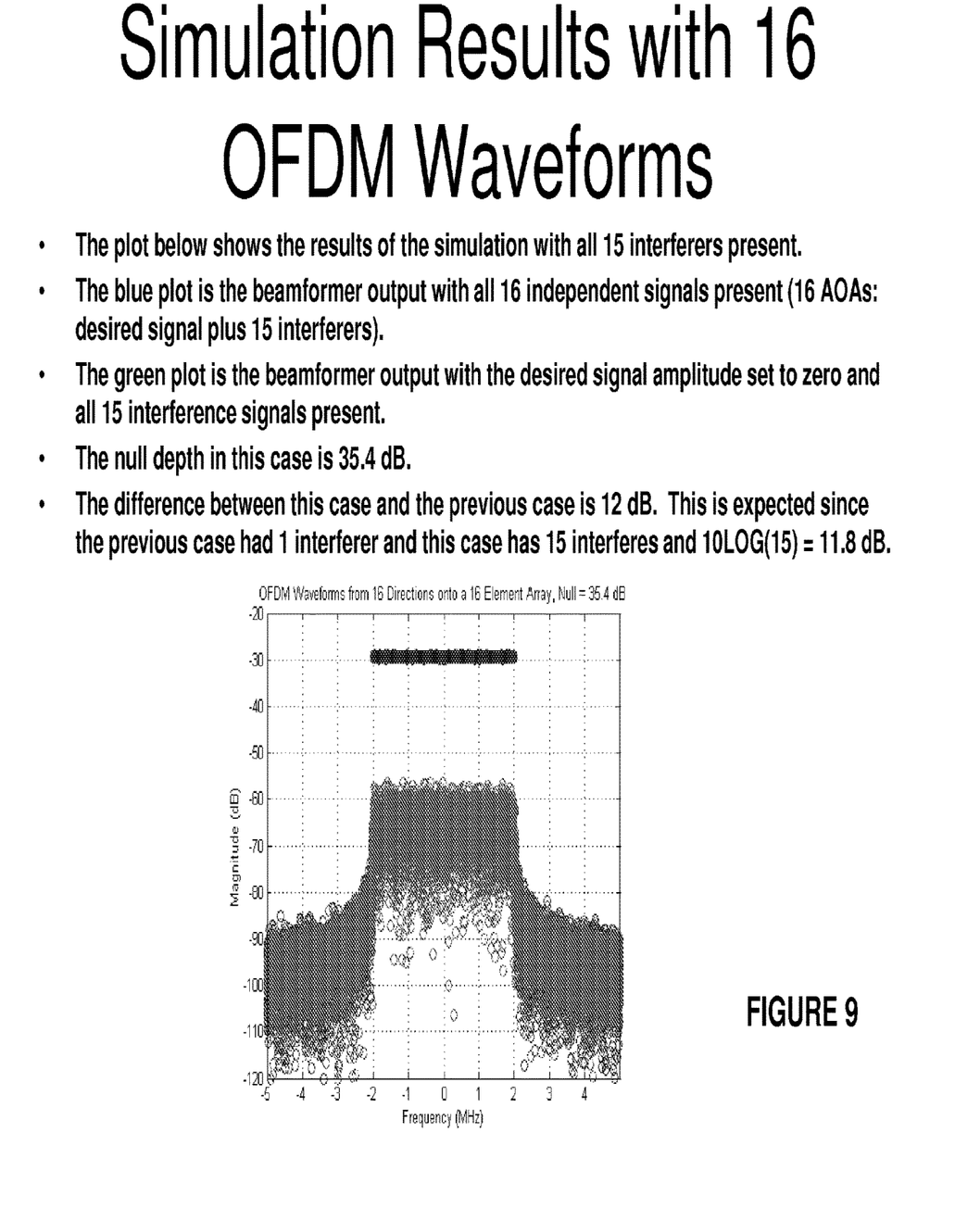
FIG. 9 shows the resulting null depth of the adaptive array processor using the semi-coherent processing of the 16 PLLs of FIG. 4.

FIG. 9 illustrates the result as generated by the adaptive array processor using the 16 channel semi-coherent transceiver with the signal-of-interest in the presence of 15 interferences. The graph illustrates a 35.4 dB nulling level between the desired signal and the sum of all 15 interfering signals. To generate this result, the adaptive processor generates the beam and null steering solution in the presence of the desired signal to "copy" the signal shown at −29 dBm. It is then toggled off to record the sum of all "leakage" interference caused by the 16 channel semi-coherent transceiver subsystem.

Figure 10:
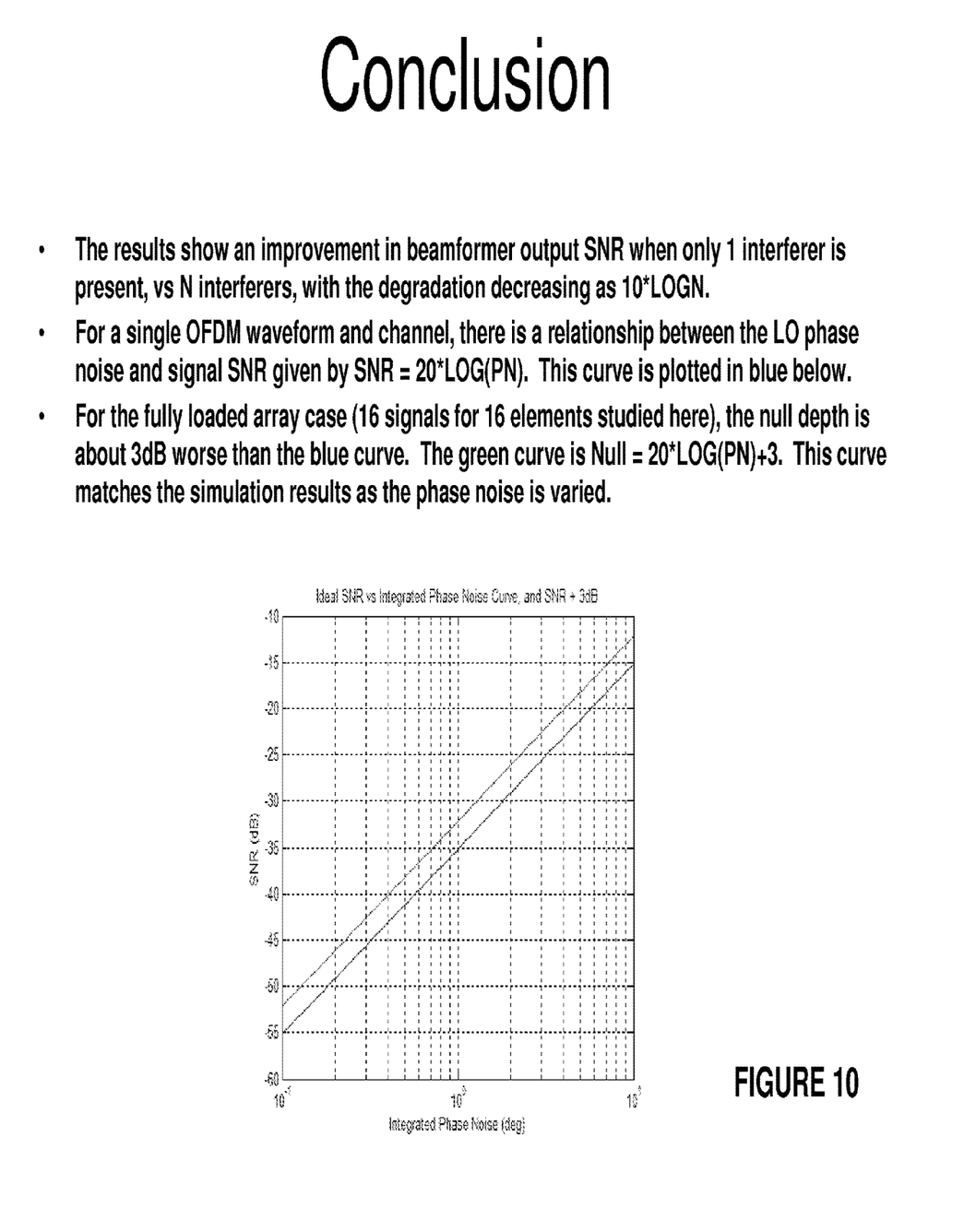
FIG. 10 illustrates the null depth of semi-coherent adaptive array processor as a function of PLL phase noise.

FIG. 10 summarized the major finding of this invention. The relationship between integrated LO phase noise and the Signal to Interference and Noise (SINR) of the desired signal in interference is simply expressed as:

$$SINR=20*\log(PN)$$

where PN is expressed in radians.

If the number of number of interferences is large and is equal to the number of antennas, then the SINR is simple expressed as $$SINR=20*\log(PN)+3$$

where PN is expressed in radians.

In summary, the viability of the semi-coherent transceiver architecture when used in adaptive array processing has been demonstrated in an practical embodiment. Its performance approaches the performance of the fully coherent design for many practical designs. As an example, if the required SINR is 25 dB for accurate demodulation and the phase noise is 0.5 deg rms yielding an SINR of −37 dB due to this impairment, then the required signal to gaussain noise should be 25.27 dB. Thus, the semi-coherent transceiver penalty is only 0.27 dB compared to the fully coherent design.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. An adaptive array radio system, comprising:
a plurality of transceivers, each transceiver of the plurality of transceivers having an antenna, an integrated local oscillator, an integrated converter, and an integrated reference buffer, wherein:
each transceiver of the plurality of transceivers is communicatively coupled to a clock source;
the clock source providing a single clock signal, wherein the single clock signal is an input to each integrated reference buffer; and
the integrated local oscillator is locked to the single clock signal, and the integrated local oscillator is configured to generate an output signal using a phase: locked loop having a phase detector, a loop filter, and a voltage control oscillator; and
the plurality of transceivers are configured to, based at least on the output signals generated by the respective integrated local oscillators, perform precision adaptive array processing.

2. The adaptive array system of claim 1, wherein the phase detector of the phase-locked loop is configured to generate a phase difference output based at least on a difference between a phase of a reference oscillator signal and a phase of a voltage control oscillator input signal.

3. The adaptive array system of claim 2, wherein the loop filter of the phase-locked loop is configured to generate a control voltage based at least on filtering the phase difference output of the phase detector.

4. The adaptive array system of claim 3, wherein the voltage control oscillator of the phase-locked loop is configured to, using the generated control voltage, generate the output signal.

5. The adaptive radio system of claim 2, wherein the voltage control oscillator input signal is a feedback signal.

6. The adaptive array radio system of claim 1, wherein adaptive noise sources affect the performance of the phase-locked loop.

7. The adaptive array radio system of claim 6, wherein the adaptive noise sources include a phase noise of a reference oscillator.

8. The adaptive array radio system of claim 6, wherein the adaptive noise sources include a phase noise of the voltage control oscillator.

9. The adaptive array radio system of claim 6, wherein the adaptive noise sources include a phase noise of a divider.

10. The adaptive array radio system of claim 6, wherein each of the adaptive noise sources provides noise based on an independent statistical process.

11. The adaptive array radio system of claim 6, wherein each of the adaptive noise sources has a different transfer function.

12. The adaptive array system of claim 8, wherein each transceiver of the plurality of transceivers is an N channel semi-coherent transceiver, and wherein the phase noise of the voltage control oscillator provided by each of the adaptive noise sources is lower than a null depth.

13. The adaptive array radio system of claim 1, wherein the loop filter of the phase-locked loop is a low pass filter.

14. The adaptive array radio system of claim 1, wherein each transceiver of the plurality of transceivers is an N channel semi-coherent FT transceiver.

15. The adaptive array radio system of claim 1, wherein the integrated reference buffer is clocked based on the single clock signal.

16. The adaptive array system of claim 1, wherein a phase of a first local oscillator of a first one of the plurality of transceivers differs from a phase of a second local oscillator of a second one of the plurality of transceivers.

17. A method comprising:
clocking a reference buffer of each of a plurality of transceivers, wherein the clocking is based at least on receiving a clock signal from a clock source;
distributing the clock signal to one or more local oscillators of each of the plurality of transceivers, wherein each local oscillator has a phase of a reference oscillator signal and a phase of a voltage control input signal;
responsive to the clocking of the reference buffer and the distributing of the clock signal, locking each local oscillator to the clock signal;
generating a phase difference output based at least on a difference between the phase of the reference oscillator signal and the phase of the voltage control input signal;
generating a control voltage based at least on applying a filter to the phase difference output;
generating, based at least on the phase difference output, an output signal; and
performing, based at least on the output signal, precision adaptive array processing by the plurality of transceivers.

18. The method of claim 17, wherein generating the output signal is further based at least on a plurality of adaptive noise sources, including a phase noise of a reference oscillator, a phase noise of a voltage control oscillator, a phase noise of a divider, or combinations thereof.

19. The method of claim 18, wherein each transceiver of the plurality of transceivers performs the precision adaptive array processing, wherein each transceiver of the plurality of transceivers is an N channel semi-coherent transceiver, and wherein the phase noise of the voltage control oscillator provided by the plurality of the adaptive noise sources is lower than a null depth.

20. The method of claim 17, wherein generating the output signal is based at least on a phase-locked loop.

21. The method of claim 17, wherein the voltage control input signal is a feedback signal.

22. The method of claim 17, wherein the filter is a low pass filter.

23. The method of claim 17 wherein a phase of a first one of the local oscillators is different than a phase of a second one of the local oscillators.

* * * * *